US008418027B2

(12) United States Patent (10) Patent No.: US 8,418,027 B2
Grimonpont et al. (45) Date of Patent: Apr. 9, 2013

(54) DEVICE ENABLING THE USE OF A PROGRAMMABLE COMPONENT IN A NATURAL RADIATIVE ENVIRONMENT

(75) Inventors: Bruno Grimonpont, Bonrepos/Aussonnelle (FR); Samuel Hazo, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 12/922,528

(22) PCT Filed: Mar. 12, 2009

(86) PCT No.: PCT/FR2009/000256
§ 371 (c)(1),
(2), (4) Date: Sep. 14, 2010

(87) PCT Pub. No.: WO2009/122029
PCT Pub. Date: Oct. 8, 2009

(65) Prior Publication Data
US 2011/0022903 A1 Jan. 27, 2011

(30) Foreign Application Priority Data
Mar. 14, 2008 (FR) ...................................... 08 51689

(51) Int. Cl.
*H03M 13/00* (2006.01)
(52) U.S. Cl. ............................ 714/758; 714/42; 714/799
(58) Field of Classification Search .................. 714/758, 714/799, 42
See application file for complete search history.

(56) References Cited

U.S. PATENT DOCUMENTS

| 6,003,144 | A | * | 12/1999 | Olarig et al. ..................... 714/42 |
| 7,036,059 | B1 | | 4/2006 | Carmichael et al. |
| 7,111,224 | B1 | | 9/2006 | Trimberger |
| 7,143,329 | B1 | | 11/2006 | Trimberger et al. |
| 7,146,555 | B2 | * | 12/2006 | Sasaki et al. .................. 714/755 |
| 7,310,759 | B1 | | 12/2007 | Carmichael et al. |
| 7,383,479 | B1 | | 6/2008 | Carmichael et al. |
| 7,512,871 | B1 | * | 3/2009 | Carmichael et al. .......... 714/797 |
| 7,617,437 | B2 | * | 11/2009 | Moyer .......................... 714/763 |
| 7,647,546 | B2 | * | 1/2010 | Lee et al. ...................... 714/784 |
| 8,020,039 | B2 | * | 9/2011 | Reid et al. ...................... 714/10 |
| 2003/0097628 | A1 | | 5/2003 | Ngo et al. |
| 2004/0237021 | A1 | | 11/2004 | Plants |
| 2007/0162798 | A1 | * | 7/2007 | Das et al. ...................... 714/724 |
| 2008/0052569 | A1 | | 2/2008 | Ngo et al. |

* cited by examiner

*Primary Examiner* — Esaw Abraham
(74) *Attorney, Agent, or Firm* — Oblon, Spivak, McClelland, Maier & Neustadt, L.L.P.

(57) ABSTRACT

A device for using a programmable component carrying out at least one logical function in a radiative environment includes: a mechanism for error detection in a data-storing working memory space actually serving to carry out each logical function of the device through use of data stored in at least one reference memory space storing a data copy implemented by at least one logical function; a mechanism blocking at least one output of at least one logical function of the component for which an error in the data implemented by the logical function is detected by the mechanism for detection; and a mechanism correcting each error detected in the working space.

18 Claims, 2 Drawing Sheets

DEVICE ENABLING THE USE OF A PROGRAMMABLE COMPONENT IN A NATURAL RADIATIVE ENVIRONMENT

BACKGROUND OF THE INVENTION

This invention relates to a device allowing the use of a programmable component in a natural radiative environment. It applies, in particular, to components of FPGA (acronym for "Field-Programmable Gate Array" for a network of gates programmable in-situ) type.

The main source of radiation is linked to the galactic radiation of the sun. The flux of this radiation changes according to the altitude and the latitude, through the effect of the magnetosphere, of the atmosphere and of the Van Allen belt, for example, which constitute obstacles and filters. In space and at high altitude, this radiation comprises mainly protons and heavy ions and, in the atmosphere, neutrons are dominant.

At sea level, the flux of the neutrons is approximately 300 times lower than what it is at an altitude of ten kilometers. Nonetheless, even at ground level, problems linked to this radiation, called "SEE" (acronym for "Single Event Effect" for effect of a single event) are noted on some systems, because of the increasing integration of the components. This matter is likely to become a stake in the years to come.

The unusual effects linked to radiations correspond to the phenomena triggered by the passage of a single particle. Among these effects, there are seen transitory defects or software errors, known under the name of "SEU" (acronym for "Single Event Upset" for disruption through a single event) which consists in an undesirable modification of the information provided by an electronic component, without impairment of the latter, under the effect of a high-energy particle.

Compared with the heavy ions, the neutrons do not deposit their energy directly. They must interact with silicon in order to produce secondary ions. All the ions deposit charges in silicon and produce a SEE in the electronic component.

The integration and the computing capacity required on on-board computers impose the use of a complex component such as FPGA, CPLD (acronym for "Complex Programmable Logic Device" for complex programmable logic circuit) and ASIC (acronym for "Application-Specific Integrated Circuit" for an integrated circuit specific to an application).

The FPGA are very widely used in electronics, because they provide a very favorable resources-cost ratio. The FPGA technologies are classified according to the three following types:
  anti-fuse,
  flash and
  RAM-based (RAM being the acronym for "Random Access Memory" for a memory with random access).

To date, in order to overcome the problem of the impact of cosmic Neutrons, called "SEU" (acronym for "Single event upset" for disruption through a single event) in natural radiative environments, the first two technologies cited often are used, because they are fault tolerant.

In order to guard against the impact of natural radiative radiation in electronics, one of the solutions is to use FPGA components of anti-fuse or flash technology. These components, by virtue of their technology and cell etching, are sturdy as regards "bits flips" and, consequently, no protection is required.

Nonetheless their drawbacks include that:
certain technologies such as anti-fuse do not allow reprogramming of the component; the component then must be unsoldered and changed in the event of development;
there are few suppliers and therefore a difficult management of dissimilarity;
because of the technology, the performances, in particular in terms of frequencies, are limited;
because of the technology, the matrices offered are limited;
the tools are less innovative, because they have fewer users and therefore fewer correctors ("debuggers").

The RAM-based type FPGA, through its technology, is high performance, offers significant logic matrices and an in-situ reprogramming (on a board). For this reason, it is used extensively in industry. Nonetheless, it has the drawback of being sensitive to the "bit-flip," that is to say change in value of a binary unit, or bit, which to date makes its use difficult in radiative environments.

The document U.S. Pat. No. 7,036,059 describes a programmable component provided with redundant logic functions and means for detection of errors in one of these logic functions. Nonetheless, the redundancy of the logic functions imposes considerable complexity and cost for programmable components.

This invention is intended to remedy these drawbacks.

SUMMARY OF THE INVENTION

To this end, according to a first aspect, this invention applies to a device allowing the use of a programmable component in a radiative environment, which comprises:
  a means for detection of error in the said programmable component due to a radiation,
  a means for blocking at least one output of the said component at the time of detection of an error and
  a means for correction of the said error.

By virtue of these arrangements, an architecture tolerant of faults ("Fault tolerant"), able to use RAM-Based type FPGA components, is obtained. In fact, the means briefly described above make it possible to detect the impact of an assault on the programmable component, and in the case of an assault, to prevent the dissemination of information items outside this component while the error is being corrected.

This invention finds applications, in particular, in critical electronic systems such as avionic, space, nuclear, automotive, medical or railway systems.

According to specific characteristics, the device that is the object of this invention, such as briefly set forth above, comprises a means for double storage of the data stored in the said component. In this way, in the case where a memory is used for data saving, by doubling the saving of the data in memory, a stable functional state is rapidly restored.

According to specific characteristics, the error detection means compares at least two data storages. The error detection means thus comprises a means for rereading the content of the memory of the component and for comparison with a reference content. This rereading and this comparison are known under the name of "readback."

According to specific characteristics, the blocking means is adapted for blocking the digital outputs of the logic function performed by the said component. In fact, it is the signals transmitted on these outputs that may be disrupted, in the event of bit-flip on the component.

According to specific characteristics, the error detection means comprises a means for verification of redundant data.

According to specific characteristics, the error correction means uses redundant data.

These redundant data make it possible to control the integrity of the data stored by the programmable component, by data blocks. A control block called "control code," for example the code "CRC" (acronym for Cyclic Redundancy Check" for control of cyclic redundancy) is associated with each data block.

According to specific characteristics, the error correction means is adapted for carrying out a total reconfiguration of the component. It is noted that the total reprogramming of the FPGA may be carried out with its reference matrix. This results in correcting the detected error and reinitiating the component. The output data from the FPGA then remain erroneous only for a period corresponding to the time for detection and the time for restarting of the system.

According to specific characteristics, the error correction means is adapted for carrying out a partial reconfiguration of the component. This partial reconfiguration corresponds to a local correction of the matrix where the error was detected. This reconfiguration does not require reinitialization of the system. After correction, the FPGA resumes a normal functioning.

According to specific characteristics, the blocking means comprises a means for storage, in buffer memory, of the data generated by the component and/or by components interfaced between the component and the buffer memory. This storage in buffer memory is known under the name of "Bufferisation."

According to specific characteristics, the storage means has a latency greater than or equal to the maximal time for detection of an error by the error detection means. In this way, no erroneous datum can leave the device.

According to specific characteristics, the device that is the object of this invention, such as briefly set forth above, comprises a means for detection of continuity of an error and a means for disabling a memory zone of the component adapted for preventing the use of a memory zone comprising the continuous error, in the event of such detection of continuity of an error. In this way the use of an irreparably damaged portion of the memory is prevented.

According to specific characteristics, the device that is the object of this invention, such as briefly set forth above, comprises a means for detection of continuity of an error and a means for disabling the error detection means in the event of such detection of continuity of an error. In this way a blocking of the system incorporating the component is avoided.

According to specific characteristics, the device that is the object of this invention, such as briefly set forth above, comprises a diagnosis means adapted for counting the errors detected by the error detection means. Such a diagnosis means is known under the name of "BITE."

According to a second aspect, this invention applies to a method allowing the use of a programmable component in a radiative environment, which comprises:
  a step of detection of error in the said programmable component due to a radiation,
  a step of blocking at least one output of the said component at the time of detection of an error and
  a step of correction of the said error.

According to a third aspect, this invention applies to a device allowing the use of a programmable component performing at least one logic function in a radiative environment, which comprises:
  a means for detection of error in a working memory space storing data actually used for the performance of each said logic function of the device, by use of data stored in at least one reference memory space storing a copy of data used by at least one said logic function,
  a means for blocking at least one output of at least one logic function of the said component for which an error in the data used by the said logic function is detected by the said detection means and
  a means for correction of each error detected in the said working space.

According to specific characteristics, the blocking means comprises a means for storage, in a buffer memory, of data generated by the component and/or by components interfaced between the component and the buffer memory.

According to specific characteristics, the storage means has a latency greater than or equal to the maximal time for detection of an error by the error detection means.

According to specific characteristics, the device that is the object of this invention, such as briefly set forth above, comprises a means for detection of continuity of an error and a means for disabling a memory zone of the component adapted for preventing the use of a memory zone comprising the continuous error, in the event of such detection of continuity of an error.

According to specific characteristics, the device that is the object of this invention, such as briefly set forth above, comprises a means for detection of continuity of an error and a means for disabling the error detection means, in the event of such detection of continuity of an error.

According to specific characteristics, the means for detection of continuity of an error comprises a diagnosis means adapted for counting the errors detected by the error detection means.

According to specific characteristics, the programmable component has no access to the reference memory spaces.

According to specific characteristics, the device that is the object of this invention, such as briefly set forth above, comprises a permutation means adapted for permuting the working memory space and a reference memory space following a complete cycle of reading the data to be protected without detection of error.

According to specific characteristics, the device that is the object of this invention, such as briefly set forth above, comprises a permutation means adapted for permuting the working memory space and a reference memory space following detection of an error in the working memory space.

The specific characteristics of the device that is the object of the first and third aspects of this invention also are specific characteristics of the device that is the object, respectively, of the third and first aspects of this invention.

According to a fourth aspect, this invention applies to a method allowing the use of a programmable component performing at least one logic function in a radiative environment, which comprises:
  a step of detection of error in a working memory space storing data actually used for the performance of each said logic function of the device, by use of data stored in at least one reference memory space storing a copy of data used by at least one said logic function,
  a step of blocking at least one output of at least each logic function of the said component for which an error in the data used by the said logic function is detected during the said detection step and
  a step of correction of each error detected in the said working space.

According to a fifth aspect, this invention applies to a computer program that can be loaded into a computer system, the said program containing instructions allowing the use of the method that is the object of this invention, such as briefly set forth above, in one of the first and third aspects.

Since the advantages, purposes and characteristics of the methods, device and computer program that are objects of the second to fifth aspects of this invention are similar to those of the device that is the object of the first aspect of this invention, such as briefly set forth above, they are not repeated here.

BRIEF DESCRIPTION OF THE DRAWINGS

Other advantages, purposes and characteristics of this invention will become apparent from the description that is going to follow, presented, with an explanatory and in no way limitative intent, with reference to the attached drawings, in which.

DETAILED DESCRIPTION OF THE INVENTION

Figure 1:
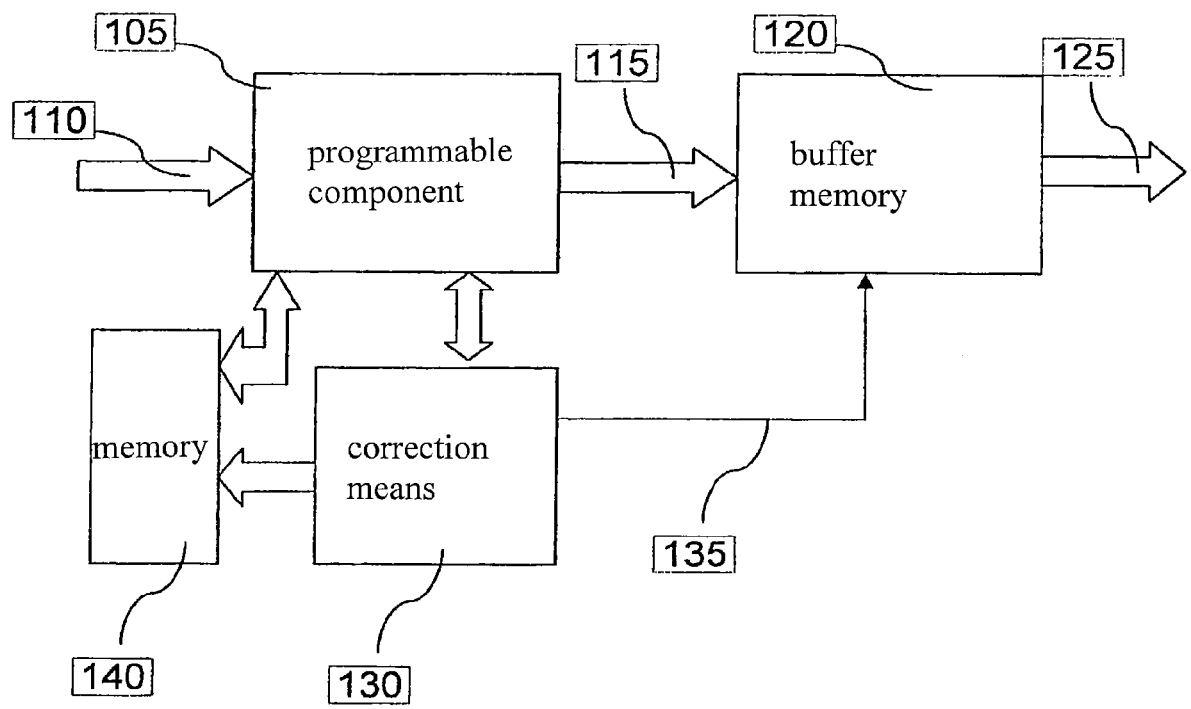
FIG. 1 schematically shows a specific embodiment of the device that is the object of this invention and FIG. 2 shows, in the form of a logic diagram, steps implemented in a specific embodiment of the method that is the object of this invention.

As seen in FIG. 1, in a specific embodiment of the device that is the object of this invention, a programmable component 105, having a data input 110 and a data output 115, is connected to a buffer memory 120 having a data output 125. An error detection and correction means 130 is connected to component 105, to buffer memory 120, through a link 135, and to a memory 140, itself connected to component 105.

Programmable component 105 is, in the embodiment described and shown, a Ram-based type FPGA, an FPGA component the configuration matrix of which is of RAM technologies, that is to say volatile. Component 105 performs a logic function of known type in an electronic or computer system (not shown). This component 105 may have these resources impaired following a change in binary value, or "bit-flip," due to the radiative environment of component 105.

Data input 110 represents the digital inputs of the logic function of component 105. Data output 115 represents the digital outputs of the logic function of component 105. These outputs may be disrupted, in the event of change in binary value, or "bit-flip," due to the radiative environment of component 105.

Error detection and correction means 130 is adapted for detecting an error occurring in component 105, following a change in binary value due to the radiative environment of component 105. This error detection and correction means 130 may use, for example:

either a readback of the content of component 105 and comparison with a reference matrix stored in memory 140, as set forth below ("Readback"), or a verification by control codes, for example cyclic redundancy codes CRC, containing data redundant in relation to the data blocks to which they refer.

In fact, an SEU on FPGA component 105 may bring about a functional error, and this error may be propagated on outputs 115 and/or on data memory 140.

In order to overcome the problem of data corruption in memory 140, the memory space thereof preferentially is divided into N parts, a working space and N−1 reference spaces. Since component 105 does not have access to the reference spaces, it therefore can "pollute" only the working space of memory 140.

Error detection and correction means 130 makes it possible to detect an error in FPGA component 105, to block the outputs through link 135 and buffer 120, and to manage the working and reference spaces of component 140. A polluted working space is disabled temporarily, then may become a reference space again (when, after error correction, no continuous and ongoing error is found in this space).

In each of the reference spaces, each datum to be protected is written once and detection and correction means 130 reads each of the values of the working space and considers that it is erroneous when it is different from the corresponding reference values. It is noted that, if it is wished to be tolerant of a number "n" of unitary errors, or "bit-flip," in successive cycles, a number of copies greater than or equal to "n+1" is made of each binary datum.

Following a complete cycle of reading the data to be protected in component 105, without detection or error, the working space, where the data used by the logic function are read, and one of the reference spaces, where the duplications of the data to be protected are stored, are permuted. Likewise, following detection of an error in the working space, a reference space is changed into the working space.

In variants, the detection and correction means uses, in known manner, control codes in order to detect and, if need be, correct the erroneous values.

In both cases, between the moment of detection of an error and the moment of its correction, link 135 conveys a signal inhibiting the reading of buffer memory 120.

It is noted that detection and correction means 130 also may perform correction of each error detected through a partial or total reconfiguration of the matrix of component 105, from data stored in memory 140.

In the case of total reconfiguration, total reprogramming of component 105 is performed with its reference matrix. This results in correcting the error and reinitializing the system. The output data of component 105 then remain erroneous for a maximum period corresponding to the total of the error detection time and the time for restarting of the system.

In the case of partial reconfiguration, a local correction of the matrix is performed, in the zone where the error was detected. This reconfiguration does not require reinitialization of the system. After correction, component 105 resumes a normal functioning. The output data of component 105 then are erroneous for a maximum period corresponding to the total of the time for detection of the error and the local correction time.

Buffer memory 120 allows a storage for a limited period, or "Bufferisation," of the data generated by component 105 or by components interfaced between buffer memory 120 and component 105. Preferentially, the storage time for data in memory 120, or latency, is greater than or equal to the maximal time for detection of an error by detection means 130.

Preferentially, error detection and correction means 130 is adapted for detecting whether a zone of the configuration matrix of component 105 represents an impaired ("upset") binary value. In the event of such a detection, the detection means is adapted either for preventing the use of this memory zone, that is to say for disabling it, or for initiating disabling of the error detection. In both cases, it is a matter of unblocking the functioning of the system.

Preferentially, error detection and correction means 130 is adapted for counting the errors and for providing a specific diagnosis ("BITE") to the SEUs.

Although, in the above description of a specific embodiment of the device that is the object of this invention, the same means 130 performs the following functions at the same time:

detection of error in programmable component 105 due to a radiation, control of blocking of at least one output of component 105, at the time of detection of an error and correction of each detected error, control of the total or partial reconfiguration of component 105, detection of continuity of an error, disabling of a memory zone of the component in order to prevent the use of a memory zone comprising the continuous error, in the event of such detection of continuity of an error, disabling of the error detection means, in the event of such detection of continuity of an error and diagnosis by counting the detected errors, in other embodiments, these functions may be performed by a plurality of means.

Figure 2:
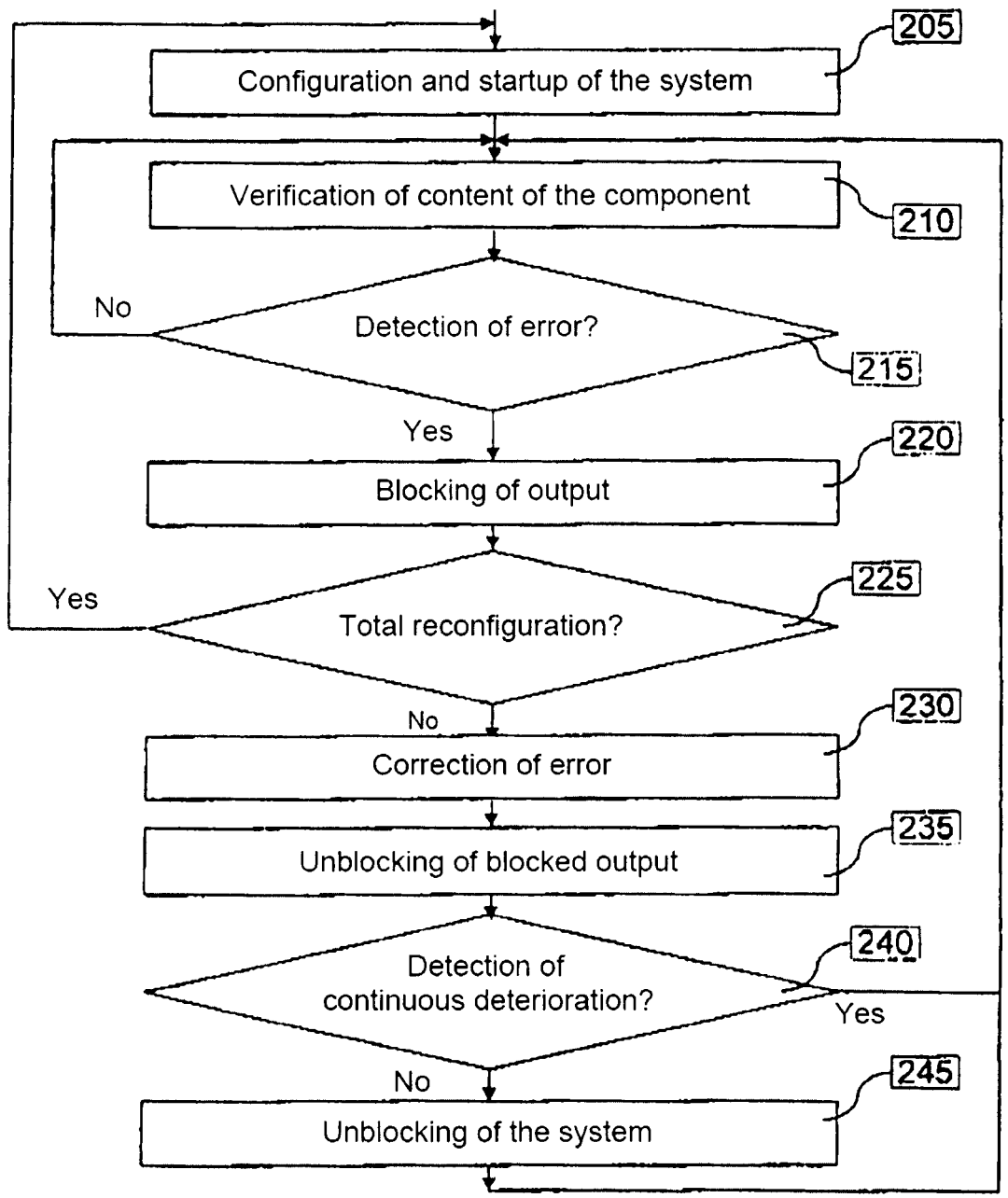

As seen in FIG. 2, for the implementation of a specific embodiment of the method that is the object of this invention, there first is performed, in a manner known in itself, a step 205 of configuration and startup of the system. It is noted that the error detection and/or correction use at least one reference space. From step 205 on, and during any writing of data to be protected, each copy is made in a reference space.

Then during a step 210, a cycle of verification of the data to be protected stored by component 105 is performed. During a step 215, it is determined whether at least one error has been detected. If no, step 210 is continued. If an error has been detected, during a step 220, a blocking of the output of data originating from component 105 is carried out, here by blocking reading of the data stored by buffer memory 120.

Then, during a step 225, it is determined whether a total reconfiguration is going to be performed, according to the error correction mode implemented by error detection and correction means 130. If yes, one goes back to step 205. If no, during a step 230, the error correction is performed, for example, by using at least one reference value stored in a reference space or a partial reconfiguration. Then during a step 235, an unblocking of the output blocked during step 220 is performed. The system therefore is then operational again.

During a step 240, it is determined whether a continuous deterioration of at least one binary datum to be protected is noted. If no, one returns to step 210. If yes, during a step 245 unblocking of the system is initiated. For example, the use of a memory zone containing the continuously erroneous datum is prevented or the verification of content of the component is stopped. In this way, a detection of continuity of an error and a disabling of a memory zone of the component in order to prevent the use of a memory zone comprising at least one continuous error are performed. The use of an irreparably damaged portion of the memory thus is prevented. As a variant, at the time of detection of continuity of a blocking error, the error detection is disabled.

As is understood upon reading of the description, the implementation of this invention makes it possible to achieve an architecture with an error-tolerant circuit and using components sensitive to radiations, for example RAM-Based FPGA.

The invention claimed is:

1. A device allowing use of a programmable component performing at least one logic function in a radiative environment comprising:
   a processor;
   an error detection unit configured to detect an error in a working memory space storing data used for performance of each logic function of the device, by use of data stored in at least one reference memory space storing a copy of data used by at least one of the logic functions;
   a blocking unit configured to block at least one output of at least one logic function of the component for which an error in the data used by the logic function is detected by the error detection unit; and
   a correction unit configured to correct each error detected in the working space.

2. A device according to claim 1, wherein the blocking unit includes a storage unit, in a buffer memory, of data generated by the component and/or by components interfaced between the component and the buffer memory.

3. A device according to claim 2, wherein the storage unit has a latency greater than or equal to a maximal time for detection of an error by the error detection unit.

4. A device according to claim 2, wherein during time between detection of an error and correction of the error, a signal is outputted that inhibits reading of the buffer memory.

5. A device according to claim 1, further comprises a detection continuity unit configured to detect continuity of an error and a disabling unit configured to disable a memory zone of the component adapted for preventing use of a memory zone including the continuous error, in event of such detection of continuity of an error.

6. A device according to claim 5, wherein the detection continuity unit includes a diagnosis unit configured to count the errors detected by the error detection unit.

7. A device according to claim 1, further comprising a detection continuity unit configured to detect continuing of an error and a disabling unit configured to disable the error detection unit, in event of such detection of continuity of an error.

8. A device according to claim 1, wherein the programmable component has no access to the reference memory spaces.

9. A device according to claim 1, further comprising a permutation unit configured to permute the working memory space and a reference memory space following a complete cycle of reading the data to be protected without detection of error.

10. A device according to claim 1, further comprising a permutation unit configured to permute the working memory space and a reference memory space following detection of an error in the working memory space.

11. A device according to claim 1, wherein the programmable component is a RAM-based Field-Programmable Gate Array.

12. A device according to claim 1, wherein after detection of the error in the working memory space, the reference memory space is changed into the working memory space.

13. A method allowing use of a programmable component device performing at least one logic function in a radiative environment, the method comprising:
   detecting an error in a working memory space storing data used for performance of each logic function of the programmable component device, by use of data stored in at least one reference memory space storing a copy of data used by at least one of the logic functions;
   blocking at least one output of at least each logic function of the component for which an error in the data used by the logic function is detected during the detecting; and
   correction of each error detected in the working space.

14. A method according to claim 13, wherein, during the blocking, there are stored, in a buffer memory, data generated by the component and/or by components interfaced between the component and the buffer memory.

15. A method according to claim 13, further comprising detecting continuity of an error and, for at least one portion of the detections of continuity of an error, disabling a memory zone of the component preventing the use of a memory zone including the continuous error.

16. A method according to claim 13, further comprising detecting continuity of an error and, for at least a portion of the detections of a continuity of an error, disabling the error detection means, according to a number of detected errors.

17. A method according to claim 13, further comprising permuting the working memory space and a reference memory space following a complete cycle of reading the data to be protected without detection of error.

18. A method according to claim 13, further comprising permuting the working memory space and a reference memory space following detection of an error in the working memory space.

\* \* \* \* \*